US012587980B2

(12) United States Patent
Kumar et al.

(10) Patent No.: US 12,587,980 B2
(45) Date of Patent: Mar. 24, 2026

(54) FFT WINDOW ADJUSTMENT BASED ON PRS PEAK PROCESSING

(71) Applicant: QUALCOMM Incorporated, San Diego, CA (US)

(72) Inventors: Mukesh Kumar, Hyderabad (IN); Alexandros Manolakos, Escondido, CA (US); Guttorm Ringstad Opshaug, Redwood City, CA (US); Srinivas Yerramalli, San Diego, CA (US); Fnu Siddhant, Bangalore (IN); Pulkit Rajgadiya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/252,033

(22) PCT Filed: Dec. 13, 2021

(86) PCT No.: PCT/US2021/063052
§ 371 (c)(1),
(2) Date: May 5, 2023

(87) PCT Pub. No.: WO2022/150149
PCT Pub. Date: Jul. 14, 2022

(65) Prior Publication Data
US 2023/0422190 A1     Dec. 28, 2023

(30) Foreign Application Priority Data
Jan. 8, 2021     (GR) .............................. 20210100014

(51) Int. Cl.
*H04W 56/00*          (2009.01)
*H04W 48/16*          (2009.01)

(52) U.S. Cl.
CPC ......... *H04W 56/001* (2013.01); *H04W 48/16* (2013.01)

(58) Field of Classification Search
None
See application file for complete search history.

(56) References Cited

U.S. PATENT DOCUMENTS

| | | |
|---|---|---|
| 9,702,965 B2 | 7/2017 | Horvat et al. |
| 10,034,191 B2 | 7/2018 | Nguyen et al. |
| (Continued) | | |

FOREIGN PATENT DOCUMENTS

| | | |
|---|---|---|
| CN | 102461292 A | 5/2012 |
| JP | 2013536616 A | 9/2013 |
| WO | 2015180776 A1 | 12/2015 |

OTHER PUBLICATIONS

Huawei, et al., "Physical Layer Procedure for NR Positioning", 3GPP Draft, 3GPP TSG RAN WG1 Meeting #96b, R1-1904006, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019 (Apr. 2, 2019), XP051707082, 11 Pages, paragraph [3.1.3]—paragraph [03.4], figure 3, table 1, sections 3.1.3, 3.3.

(Continued)

*Primary Examiner* — German Viana Di Prisco
(74) *Attorney, Agent, or Firm* — QUALCOMM Incorporated

(57) ABSTRACT
A user equipment (UE) associated with a wireless network determines a first reference signal time difference value. The UE determines a first RSTD estimate and a first RSTD uncertainty associated with the first RSTD value, identifies a search interval for the first RSTD value, the search interval extending from a difference between the first RSTD estimate and the first RSTD uncertainty to a sum of the first RSTD (Continued)

estimate and the first RSTD uncertainty, receives wireless signals during the identified search interval, determines a Fast Fourier Transform (FFT) window offset for decoding a first positioning reference signal (PRS) received during the identified search interval, and determines the first RSTD value based at least in part on the determined FFT window offset.

30 Claims, 10 Drawing Sheets

(56) References Cited

U.S. PATENT DOCUMENTS

| | | | |
|---|---|---|---|
| 10,219,238 B2 | 2/2019 | Abdi et al. | |
| 2011/0205122 A1 | 8/2011 | Siomina et al. | |
| 2013/0107785 A1* | 5/2013 | Bhattad | H04J 11/005 |
| | | | 370/312 |
| 2013/0336133 A1 | 12/2013 | Carbonelli et al. | |
| 2015/0141048 A1 | 5/2015 | Woo et al. | |
| 2017/0280280 A1* | 9/2017 | Jain | H04W 64/00 |
| 2018/0332430 A1 | 11/2018 | Kumar et al. | |
| 2020/0228381 A1 | 7/2020 | Manolakos et al. | |
| 2020/0233057 A1 | 7/2020 | Edge et al. | |
| 2021/0320769 A1* | 10/2021 | Cha | H04W 48/12 |

OTHER PUBLICATIONS

International Search Report and Written Opinion—PCT/US2021/063052—ISA/EPO—Mar. 25, 2022.
3GPP TS 37.355: "3rd Generation Partnership Project, Technical Specification Group Radio Access Network, LTE Positioning Protocol (LPP)(Release 16)", 3GPP TS 37.355 V16.3.0, Dec. 2020, pp. 1-295, Section 3.1.3, Section 6.4.3.
Taiwan Search Report—TW110146813—TIPO—May 16, 2025.

* cited by examiner

900

902

Determine a first reference signal time difference (RSTD) estimate and a first RSTD uncertainty associated with the first RSTD estimate.

904

Identify a search interval for the first RSTD value, the search interval extending from a difference between the first RSTD estimate and the first RSTD uncertainty to a sum of the first RSTD estimate and the first RSTD uncertainty.

906

Receive wireless signals during the identified search interval.

908

Determine a Fast Fourier Transform (FFT) window offset for decoding a first positioning reference signal (PRS) received during the identified search interval.

910

Determine the first RSTD value based at least in part on the determined FFT window offset.

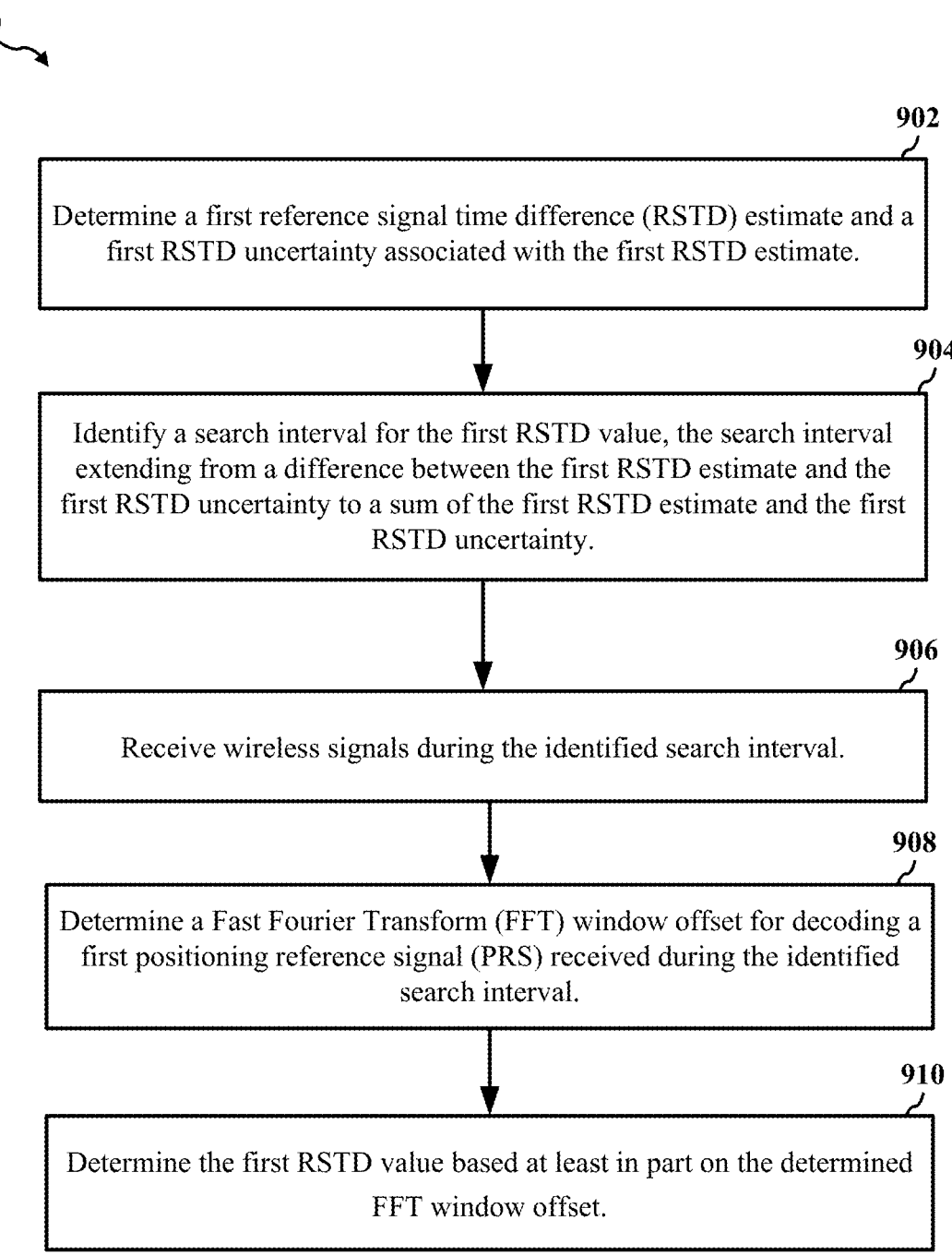

*FIG. 9*

FFT WINDOW ADJUSTMENT BASED ON PRS PEAK PROCESSING

CROSS-REFERENCE TO RELATED APPLICATIONS

This application is a National Phase entry of International Application No. PCT/US2021/063052, filed Dec. 13, 2021, entitled "FFT WINDOW ADJUSTMENT BASED ON PRS PEAK PROCESSING", which claims the benefit of Greek patent application Ser. No. 20210100014, filed Jan. 8, 2021, both of which are assigned to the assignee hereof and hereby incorporated by reference in their entirety.

BACKGROUND

Field

Subject matter disclosed herein relates to determining reference signal time difference (RSTD) values in user equipment (UE) associated with a wireless network.

Information

The location of a mobile device, such as a cellular telephone, may be useful or essential to a number of applications including emergency calls, navigation, direction finding, consumer asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). Assistance data is sent to a mobile device to assist in acquiring and measuring signals and/or in computing a location estimate from the measurements, which may be useful for acquiring PRS for location determination. A mobile device acquiring PRSs transmitted by different base stations may deliver signal-based measurements to a location server, which may be part of an Evolved Packet Core (EPC) or 5G Core Network (5GCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT).

Positioning reference signals (PRS) are transmitted, e.g., during periodically or dynamically assigned positioning occasions. Reception of such PRS may be impaired in the presence of channel noise or interference. Accordingly, improving reception of such PRS is to be desired.

SUMMARY

A user equipment determines reference signal time differences (RSTDs) for received positioning reference signals (PRSs) without the Fast Fourier Transform (FFT) window for receiving the PRS being tied to serving cell symbol timing. The UE may determine a search interval for an RSTD value which depends only on an expected value of the RSTD value and an associated uncertainty of the RSTD value. The UE may then determine an FFT window offset for decoding a PRS received during the search interval, and determine the RSTD value based on the determined FFT window offset.

In one implementation, a method for supporting positioning of a user equipment (UE) in a wireless network performed by the UE is disclosed. The method may include determining a first RSTD estimate and a first RSTD uncertainty associated with the first RSTD value, identifying a search interval for the first RSTD value, the search interval extending from a difference between the first RSTD estimate and the first RSTD uncertainty to a sum of the first RSTD estimate and the first RSTD uncertainty, receiving wireless signals during the identified search interval, determining a Fast Fourier Transform (FFT) window offset for decoding a first positioning reference signal (PRS) received during the identified search interval, and determining the first RSTD value based at least in part on the determined FFT window offset.

In one implementation, a user equipment (UE) configured to determine a first RSTD value is disclosed, where the UE is associated with a wireless network and includes a wireless transceiver configured to wirelessly communicate with entities in the wireless network, at least one memory, and at least one processor coupled to the wireless transceiver and the at least one memory. The at least one processor is configured to determine a first RSTD estimate and a first RSTD uncertainty associated with the first RSTD value, identify a search interval for the first RSTD value, where the search interval extends from a difference between the first RSTD estimate and the first RSTD uncertainty to a sum of the first RSTD estimate and the first RSTD uncertainty, receive wireless signals during the identified search interval, determine an FFT window offset for decoding a first PRS received during the identified search interval, and determine the first RSTD value based at least in part on the determined FFT window offset.

In one implementation, a non-transitory computer readable storage medium is disclosed, storing instructions for execution by one or more processors of a UE associated with a wireless network. Execution of the instructions causes the UE to perform operations including determining a first RSTD estimate and a first RSTD uncertainty associated with a first RSTD value, identifying a search interval for the first RSTD value, the search interval extending from a difference between the first RSTD estimate and the first RSTD uncertainty to a sum of the first RSTD estimate and the first RSTD uncertainty, receiving wireless signals during the identified search interval, determining a Fast Fourier Transform (FFT) window offset for decoding a first positioning reference signal (PRS) received during the identified search interval, and determining the first RSTD value based at least in part on the determined FFT window offset.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 9 shows a flowchart for an exemplary method for supporting positioning of a UE in a wireless network performed by the UE.

DETAILED DESCRIPTION

Figure 1:
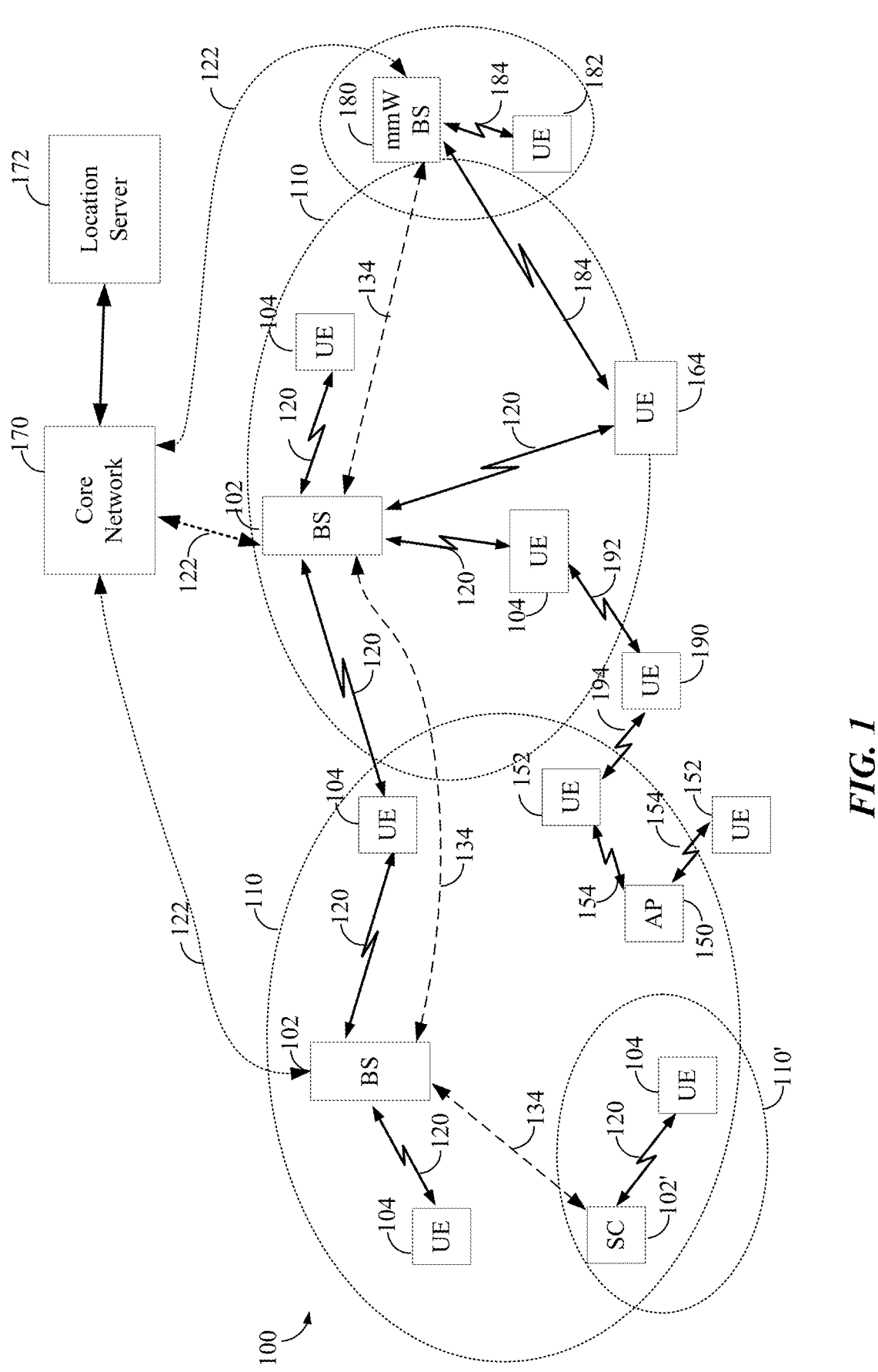
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbour base stations or Transmission and Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
|---|---|---|
| Rel.16 DL PRS | DL RSTD | DL-TDOA |
| Rel.16 DL PRS | DL PRS RSRP | DL-TDOA, DL-AOD, Multi-RTT |
| Rel.16 DL PRS/Rel.16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM) | E-CID |

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through back-haul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
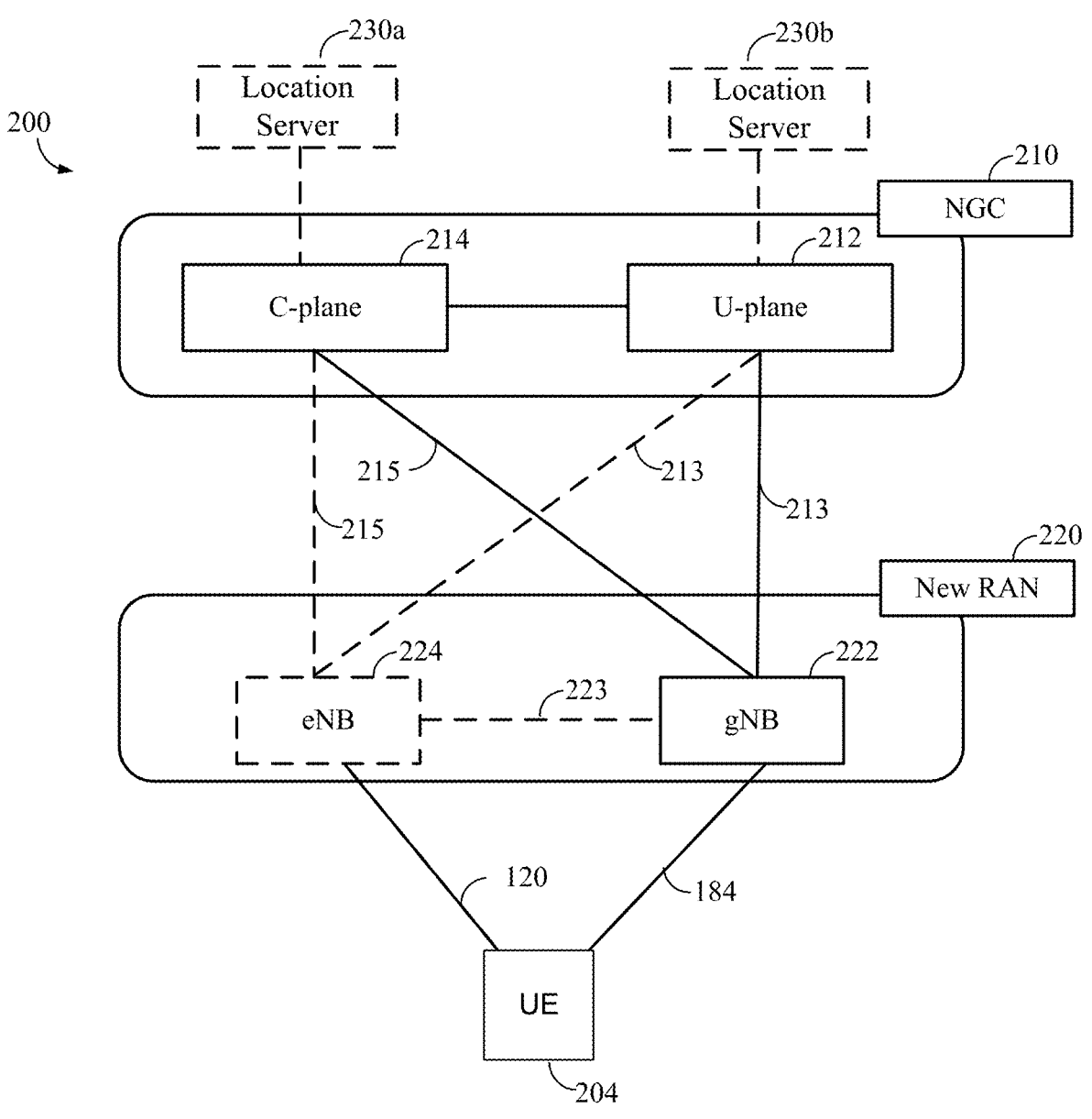
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
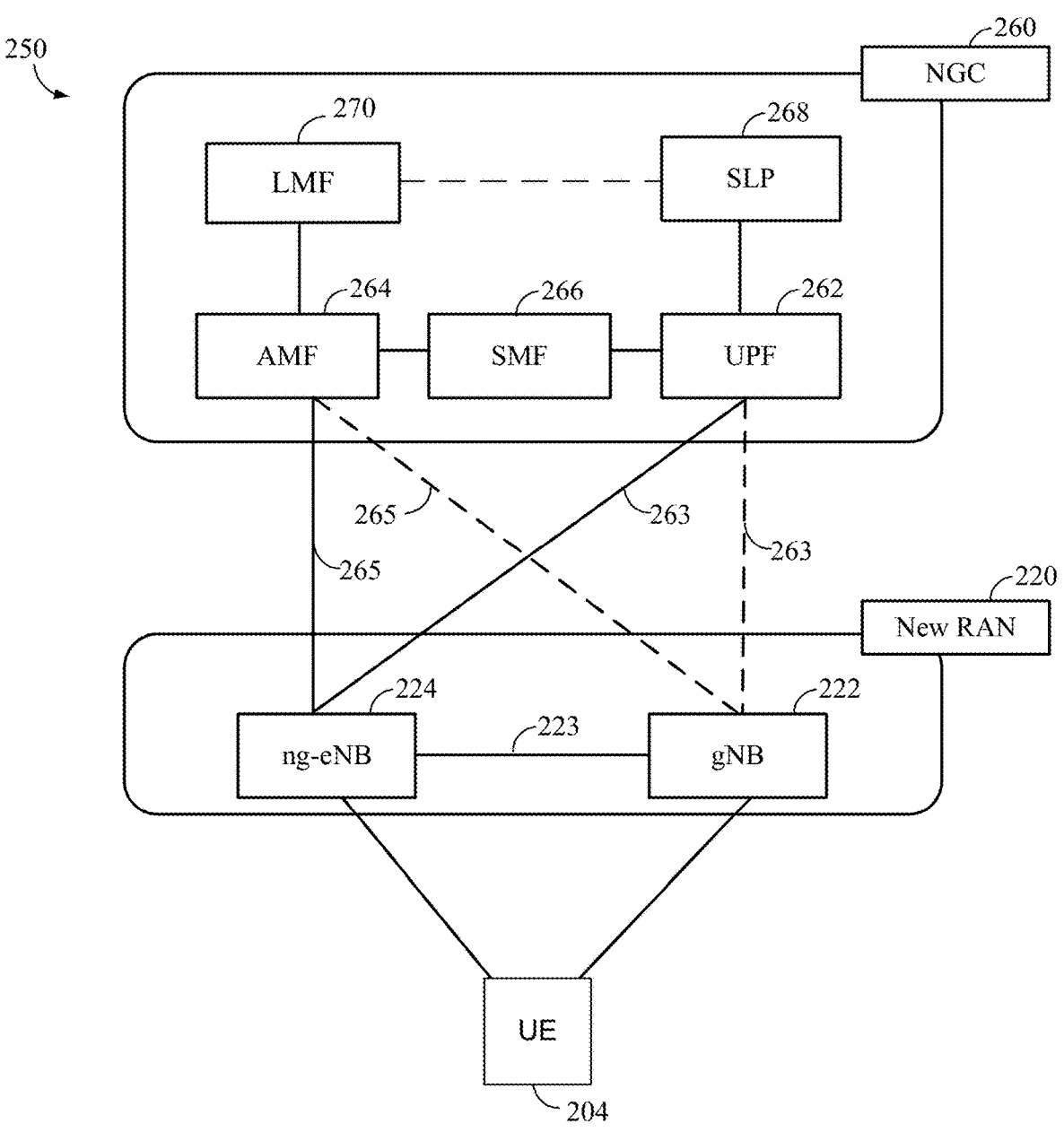

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
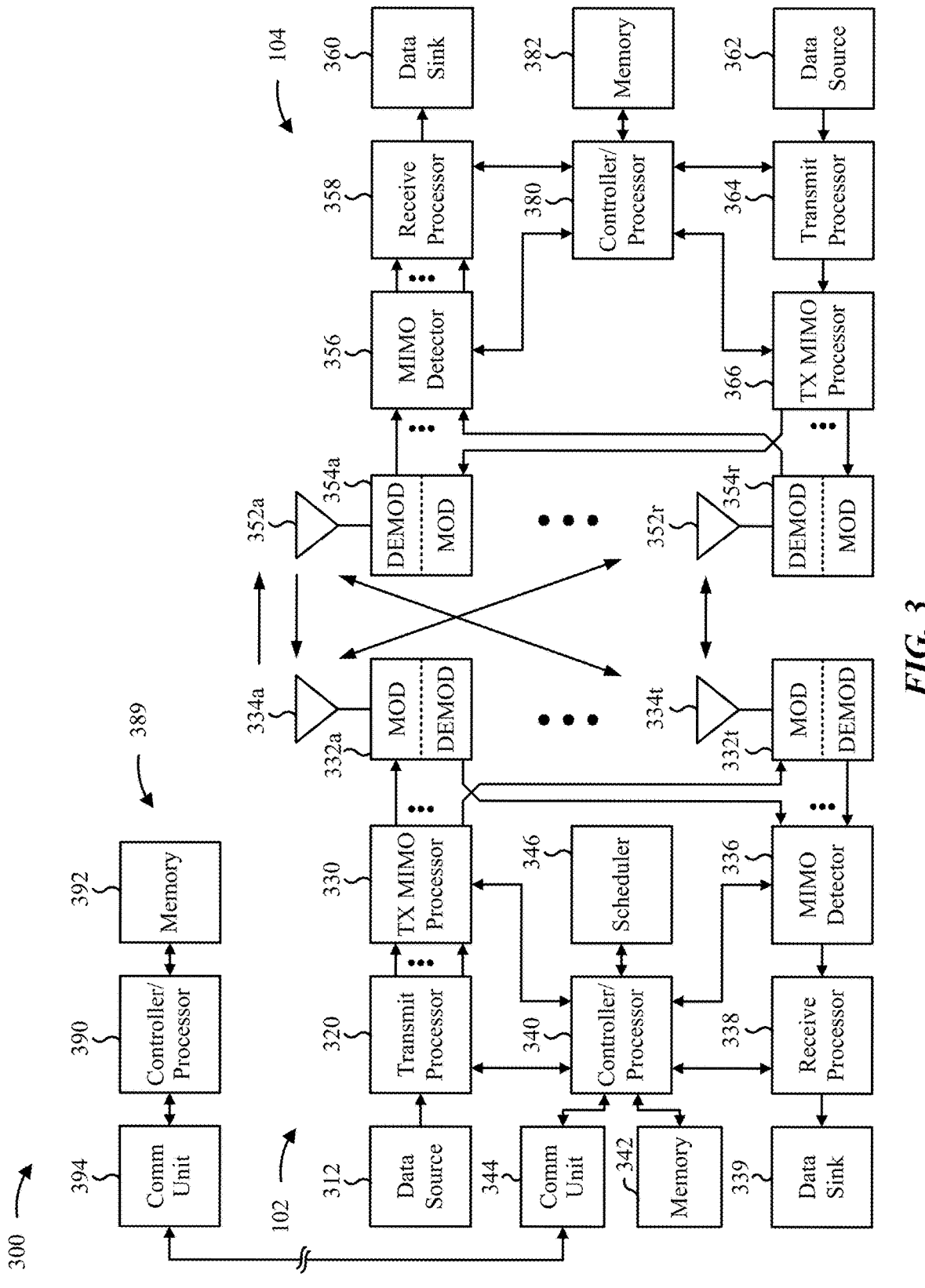
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, controller 390 of network controller 389, which may be location server 172, and/or any other component(s) of FIG. 3 may perform one or more techniques associated broadcasting positioning assistance data in a differential manner, as described in more detail elsewhere herein. For example, controller/processor 340 of base station 102, controller 390 of network controller 389, controller/processor 380 of UE 104, and/or any other component(s) of FIG. 3 may perform or direct operations of, for example, process 900 of FIG. 9, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of the base station 102 network controller 389, and/or the UE 104, may perform or direct operations of, for example, process 9 of FIG. 9 and/or other processes as described herein. A scheduler 346 may schedule UEs for data transmission on the downlink and/or uplink.

As indicated above, FIG. 3 is provided as an example. Other examples may differ from what is described with regard to FIG. 3.

As discussed above, positioning for a UE may be based on PRS received by the UE. For example, differences in timing among different UEs may be used for position, such as reference signal timing difference (RSTD) measurements. However, in order to perform the RSTD measurements, the UE requires information about when the to-be-measured PRS signals are expected to arrive. For example, a location server in the network, such as location server 172, 230a, or 230b, may send TDOA assistance data to the UE including, for example, an expected RSTD value that the UE is expected to measure between a neighbor cell and the reference cell, and an uncertainty in the expected RSTD value. In some implementations the expected RSTD value and uncertainty may be included in TDOA neighbor cell assistance information provided by the location server, for example in an TDOA neighbor cell information element (IE). The location server may determine the expected RSTD value and uncertainty based, for example, on a rough a-priori location of the UE (e.g., from Cell-ID or Enhanced Cell-ID positioning), and on a known location of a corresponding neighbor eNB or gNB. Other information may also be specified in such an TDOA neighbor cell IE, such as a cyclic prefix (CP) length of the neighbor cell's PRS and other configuration information about the neighbor cell's PRS, if it is different compared to the reference cell.

Figure 4:
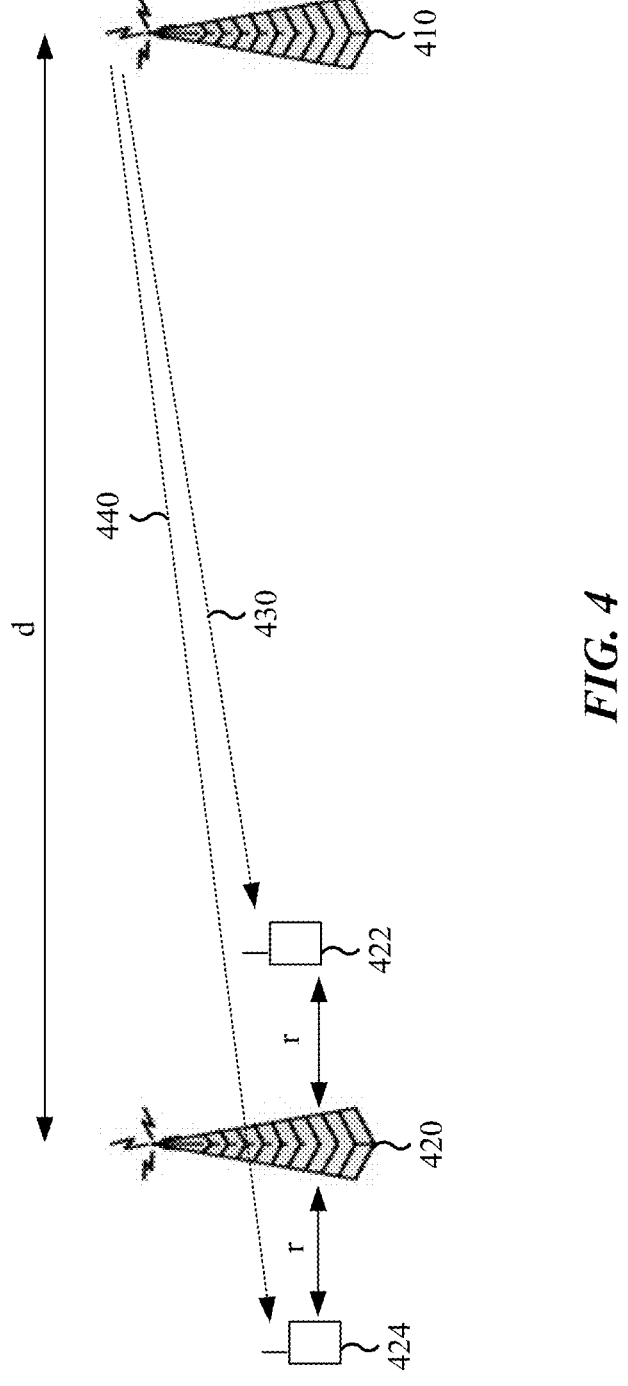
FIG. 4 shows a structure of an exemplary system for determining a reference signal time difference (RSTD) search window size, according to various aspects of the disclosure.

FIG. 4 shows a structure of an exemplary system 400 for determining a reference signal time difference (RSTD) search window size, according to various aspects of the disclosure. As discussed above, a location server may provide a UE an expected RSTD value and an uncertainty in that predicted RSTD value. Such expected RSTD values and uncertainties may be based on the distance between the reference cell and the neighbor cell, and on the size of the reference cell. With respect to FIG. 4, a neighbor cell 410 may transmit PRS to UEs associated with a reference cell 420. Note that the neighbor cell may be an eNB, a gNB, a TRP, or any other suitable device capable of wireless transmission and reception. The neighbor cell 410 and the reference cell 420 may be separated by a known distance d. A UE, such as UE 104 may not have a known position within the reference cell 420, and may therefore be at most a distance r from the reference cell, where r is the maximum cell radius. Thus, for example, the UE 104 may be no closer to the neighbor cell 410 than a first position 422, and no further from the neighbor cell 410 than a second position 424, where each of the first position 422 and the second position 424 are a distance r from the reference cell 420. The neighbor cell may transmit PRS to the UE 104 at a time t and be received by the UE 104 at a time depending on the position of the UE. For example, if the UE 104 is at the first position 422, then the PRS may be received via a shortest path 430, and if the UE 104 is at the second position 424, then the PRS may be received via a longest path 440. The earliest the PRS from the neighbor cell 410 may be received by the UE 104 (via the shortest path 430) may be at (t+d/c−r/c), where c is the speed of propagation of the PRS. Similarly, the latest the PRS from the neighbor cell 410 may be received by the UE 104 (via the longest path 440) is (t+d/c+r/c). The RSTD of the neighbor cell 410 is therefore measured by the UE 104 at the first and second positions 422 and 424 as (d/c−2r/c) and (d/c), respectively. Accordingly, a search window may be in a range [−r/c, +r/c] centered at (d/c−r/c). This search window center is the expected RSTD value provided by the location server, and the search window size corresponds to the expected RSTD uncertainty. Note that the center of the search window, and therefore the expected RSTD value, may vary depending on the transit time difference of the reference signals provided by the reference cell and the neighbor cell. Such a transit time difference may be referred to as a reference time difference, or RTD. The above calculations treat RTD as zero, meaning that the transmissions from the reference cell 420 and the neighbor cell 410 are synchronized.

Figure 5:
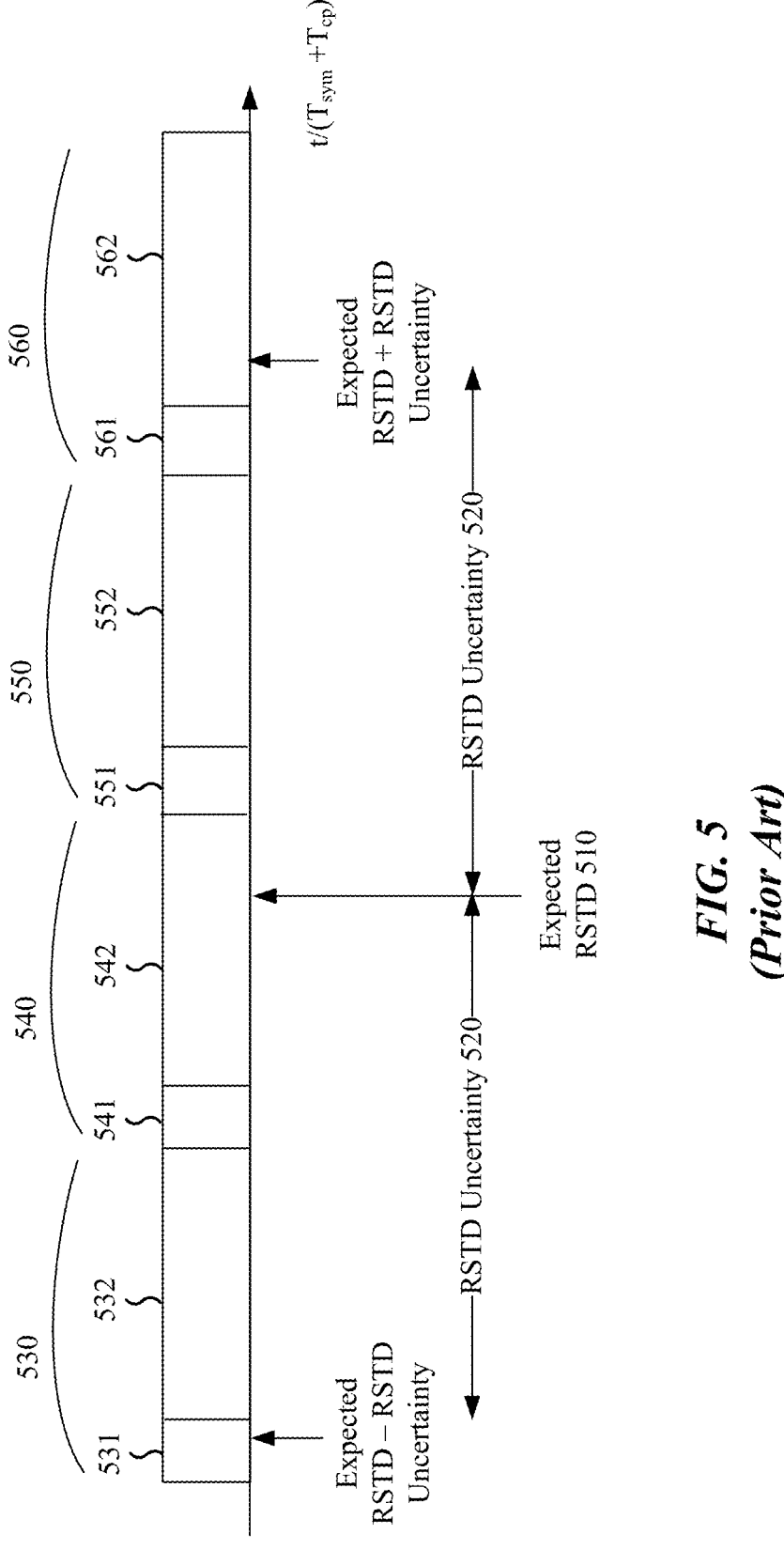
FIG. 5 shows a conventional set of PRS timing hypotheses.

FIG. 5 shows a conventional set of PRS timing hypotheses. As discussed above, a UE may receive an expected RSTD value and an associated RSTD uncertainty, for example in assistance data received from a location server. Thus, with respect to FIG. 5, an RSTD search window may be centered at an expected RSTD 520, extending an RSTD uncertainty 520 before and after the expected RSTD 510. For example, the expected RSTD may be 10 us, and the associated RSTD uncertainty may be 100 us. In conventional PRS reception techniques, timing is tied to the serving cell CRS/TRS/CSI channel. In other words, the Fast Fourier Transform (FFT) window for receiving the PRS is aligned with symbol timing on the serving cell CRS/TRS/CSI channel. The timing is tied to serving cell symbol timing for conventional techniques because other channel activity and data decoding is performed in parallel with PRS reception and processing. Thus, with respect to FIG. 5, a search window for receiving the PRS may include 4 hypotheses: symbols 530, 540, 550, and 560, including respective cyclic prefixes 531, 541, 551, and 551 and respective payloads 532, 542, 552, and 562. The UE may attempt reception of the PRS using each of the 4 symbols, and select the symbol allowing for the best reception of the PRS, for example, selecting the symbol having the highest signal to noise ratio (SNR) among the hypotheses.

Figure 6:
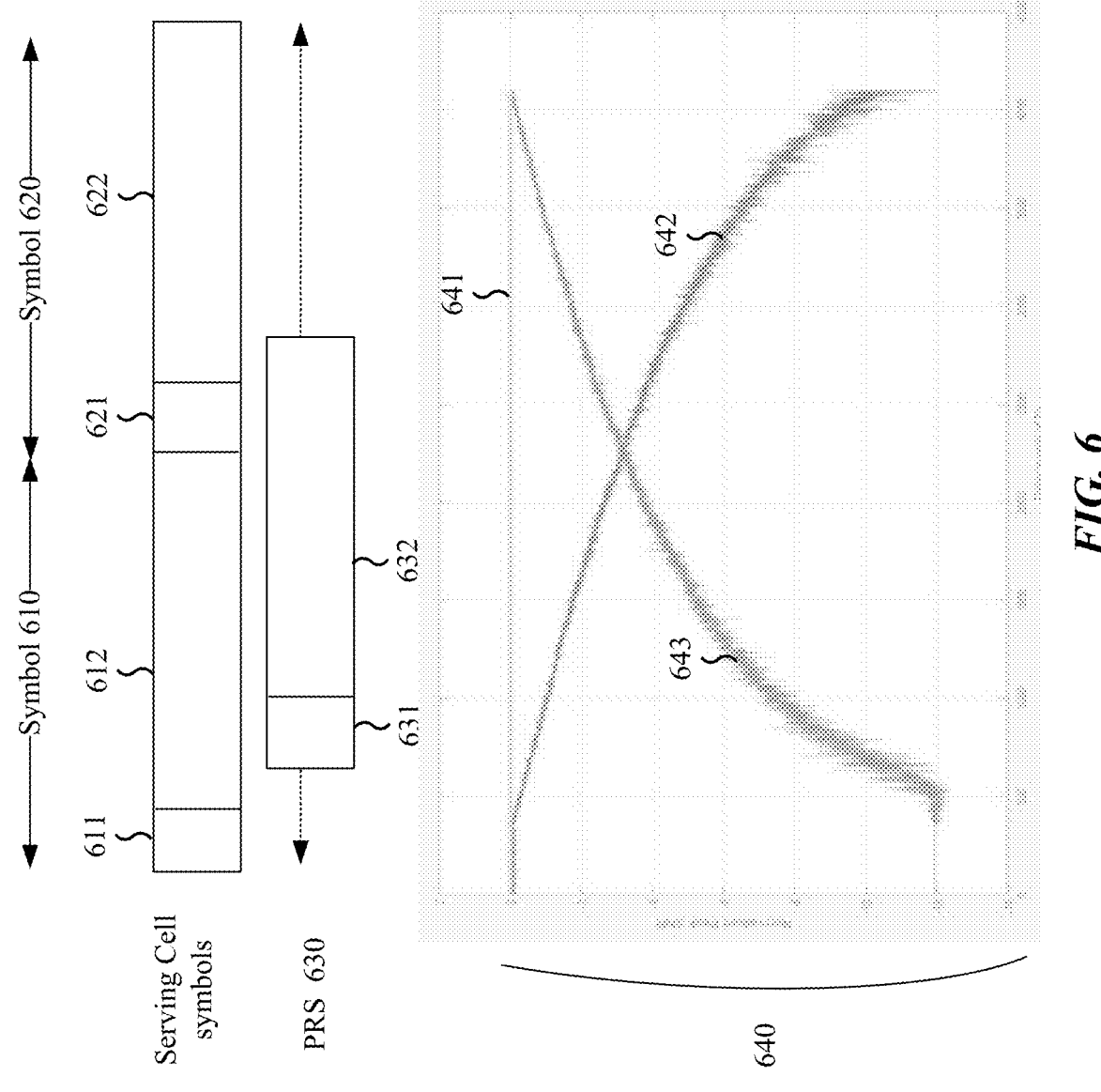
FIG. 6 visually illustrates a relationship between signal to noise ratio (SNR) and PRS symbol timing with respect to serving cell boundaries.

In conventional PRS reception, such as depicted in FIG. 5, because the PRS hypotheses are tied to the serving cell symbol timing, it is very likely that the FFT window of the selected hypothesis will not cover the received PRS from the neighbor cell. That is, the received PRS is very unlikely to align with the symbol timing of the serving cell. This may impair reception of the PRS, as shown in FIG. 6. FIG. 6 visually illustrates a relationship 600 between signal to noise ratio (SNR) and PRS symbol timing with respect to serving cell boundaries. More particularly, FIG. 6 shows how the SNR of a received PRS 630 may vary depending on its degree of alignment with the serving cell's symbol timing. For example, serving cell symbols 610 and 620 may be two serving cell symbols which are hypotheses for receiving the PRS—in other words, serving cell symbols 610 and 620 may be among the symbols 530-560 of FIG. 5. The symbols 610, 620, and the PRS 630 may include respective cyclic prefixes 611, 621, and 631, as well as respective payloads 612, 622, and 632. SNR plot 640 shows how the SNR for receiving the PRS 630 varies as the time of reception of the PRS 630 varies from being fully aligned with symbol 610 to being fully aligned with the symbol 620 in steps of 8 ns. More particularly, plot 641 shows the SNR for receiving the PRS 630 using an FFT window fully aligned with the PRS 630, plot 642 shows the SNR for receiving the PRS 630 using an FFT window aligned with symbol 610, and plot 643 shows the SNR for receiving the PRS 630 using an FFT window aligned with symbol 620. SNR plot 640 illustrates the SNR degradation resulting from conventional PRS reception techniques, where the PRS 630 is received using an FFT window aligned with a symbols of the serving cell. Unless the PRS 630 is fully aligned with either symbol 610 or symbol 620, SNR loss will result, and this SNR loss is in addition to any SNR loss from the channel or interference. Accordingly, it would be desirable to receive PRS at a UE without suffering the SNR loss from conventional techniques.

The example implementations allow for a UE to determine an RSTD value for a neighboring cell without requiring PRS reception to be tied to serving cell symbol timing. More particularly, example implementations provide a measurement gap for receiving the PRS, during which no other modem activities are performed by the UE. FFT window timing is not tied to the serving cell symbol timing, and the PRS timing hypotheses are based only on the expected RSTD value and the associated RSTD uncertainty. Thus, UEs may determine an FFT window offset resulting in a peak SNR for receiving a PRS from a neighboring cell, according to aspects of the present disclosure. Further, in some implementations, example UEs may incorporate a more compact RSTD search window as compared with conventional techniques and may further reduce the number and timing of subsequent PRS hypotheses to center on the determined FFT window offset.

Figure 7:
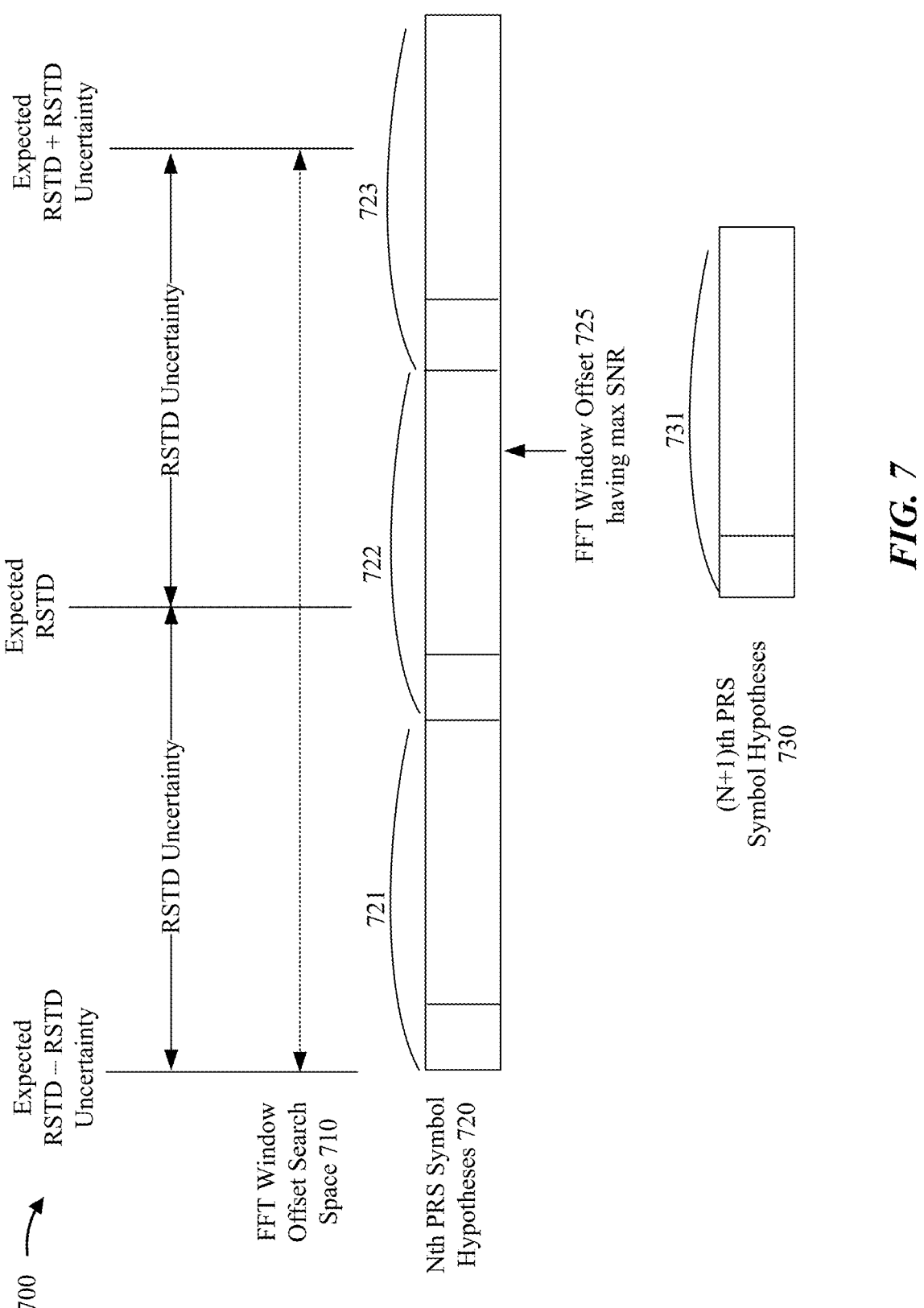
FIG. 7 shows a depiction of RSTD determination and PRS timing hypotheses, according to various aspects of the disclosure.

FIG. 7 shows a depiction 700 of RSTD determination and PRS timing hypotheses, according to various aspects of the disclosure. Similarly to FIG. 5, the expected RSTD value and the associated RSTD uncertainty are known, for example provided to the UE 104 by a location server in assistance information, as discussed above. However, in contrast to conventional techniques, PRS hypothesis timing is not tied to serving cell timing. The FFT window offset search space 710 therefore depends only on the expected RSTD value and the RSTD uncertainty. More particularly, the FFT window offset search space 710 for receiving the PRS extends from a difference between the expected RSTD value and the RSTD uncertainty (Expected RSTD−RSTD uncertainty) to a sum of the expected RSTD value and the RSTD uncertainty (Expected RSTD+RSTD uncertainty). The UE 104 may determine the FFT window offset within the search space 710 which maximizes an SNR for receiving the PRS.

In some implementations, the UE 104 may initially select a PRS hypothesis having a largest SNR for receiving the PRS, while additionally determining the FFT window offset which maximizes the SNR for receiving the PRS. This selection and determination may be performed concurrently by the UE 104 in some implementations. For example, during an Nth reception of PRS 720, the UE 104 may select from a first PRS symbol hypothesis 721, a second PRS symbol hypothesis 722, and a third PRS symbol hypothesis 723, selecting the PRS symbol hypothesis having the largest SNR for receiving the PRS. Concurrently, the UE 104 may determine the FFT window offset which maximizes SNR for reception of the PRS. Subsequently, for example during an (N+1)th reception of PRS 730, the UE 104 may center the PRS symbol hypothesis 731 at the FFT window offset which maximized the SNR for receiving the PRS during the Nth reception of PRS.

More generally, the UE 104 may reduce the number of PRS hypotheses in subsequent receptions of PRS and base such PRS hypotheses on the determined FFT window offset. Further, in some implementations the UE 104 may also reduce the RSTD uncertainty associated with subsequent receptions of PRS. Further, while the FFT window offset and the RSTD are determined without reference to the serving cell timing, subsequently the FFT window offset and the RSTD may be adjusted with respect to such serving cell timing.

Figure 8:
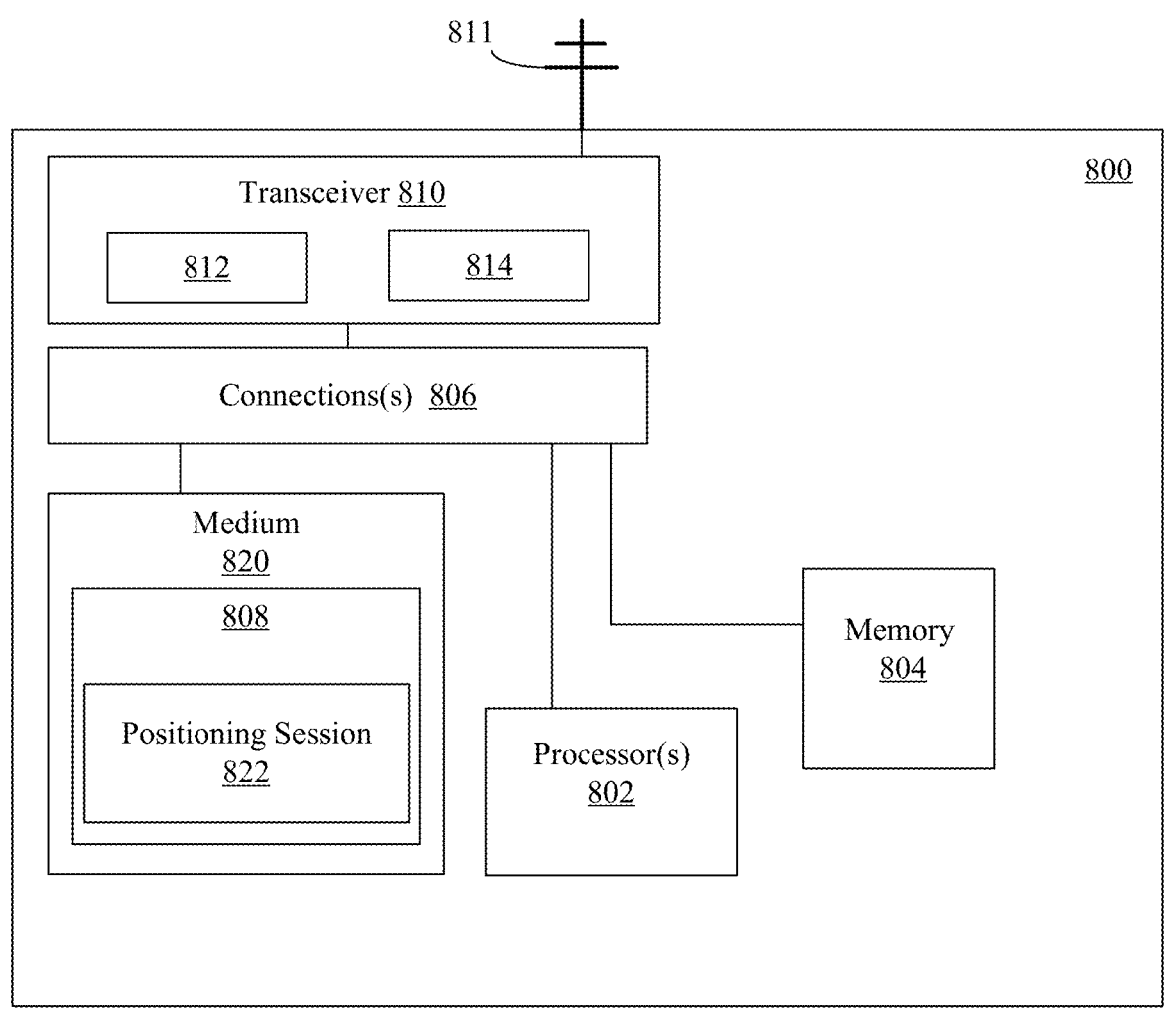
FIG. 8 shows a schematic block diagram illustrating certain exemplary features of a UE enabled to support determining RSTD values, according to various aspects of the disclosure.

FIG. 8 shows a schematic block diagram illustrating certain exemplary features of a UE 800, e.g., which may be UE 104 shown in FIG. 1, enabled to support positioning of the UE using PRS signals, as described herein. The UE 800 may perform the process flow shown in FIG. 9. UE 800 may, for example, include one or more processors 802, memory 804, an external interface such as a transceiver 810 (e.g., wireless network interface), which may be operatively coupled with one or more connections 806 (e.g., buses, lines, fibers, links, etc.) to non-transitory computer readable medium 820 and memory 804. The UE 800 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 800 may take the form of a chipset, and/or the like. Transceiver 810 may, for example, include a transmitter 812 enabled to transmit one or more signals over one or more types of wireless communication networks and a receiver 814 to receive one or more signals transmitted over the one or more types of wireless communication networks.

In some embodiments, UE 800 may include antenna 811, which may be internal or external. UE antenna 811 may be used to transmit and/or receive signals processed by transceiver 810. In some embodiments, UE antenna 811 may be coupled to transceiver 810. In some embodiments, measurements of signals received (transmitted) by UE 800 may be performed at the point of connection of the UE antenna 811 and transceiver 810. For example, the measurement point of reference for received (transmitted) RF signal measurements may be an input (output) terminal of the receiver 814 (transmitter 812) and an output (input) terminal of the UE antenna 811. In a UE 800 with multiple UE antennas 811 or antenna arrays, the antenna connector may be viewed as a virtual point representing the aggregate output (input) of multiple UE antennas. In some embodiments, UE 800 may measure received signals including signal strength and TOA measurements and the raw measurements may be processed by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors. A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in UE 800 is merely exemplary, and as such the functionality of the modules and/or data structures may be combined, separated, and/or be structured in different ways depending upon the implementation of the UE 800.

The medium 820 and/or memory 804 may include a positioning session module 822 that when implemented by the one or more processors 802 configures the one or more processors 802 to engage in a positioning session for the UE. For example, the one or more processors 802 may be configured to engage in a positioning session by providing positioning capabilities to a location server, via the transceiver 810. The one or more processors 802 may be configured to receive positioning assistance data from a location server and/or serving base station, via the transceiver 810. The one or more processors 802 may be configured to perform positioning measurements, e.g., using the transceiver 810. The one or more processors 802 may further be configured to provide a measurement information report, via the transceiver 810, to a network node, such as location server, serving base station or a sidelink UE.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support positioning of the UE using PRS signals in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

FIG. 9 shows a flowchart for an exemplary method 900 for supporting positioning of a UE in a wireless network performed by the UE, such as UE 104, in a manner consistent with disclosed implementation.

At block 902, the UE determines a first reference signal time difference (RSTD) estimate and a first RSTD uncertainty associated with the first RSTD estimate. For example, the UE may determine the first RSTD estimate and the first RSTD uncertainty based on received assistance data, such as in a TDOA neighbor cell IE or another IE received from a location server or other device in a network associated with the UE. In some aspects, a means for determining the first RSTD estimate and the first RSTD uncertainty may include the wireless transceiver 810 and one or more processors 802 with dedicated hardware or implementing executable code or software instructions in memory 804 and/or medium 820, such as the positioning session module 822, in UE 800 shown in FIG. 8.

At block 904, the UE identifies a search interval for a first RSTD value, where the search interval extends from a difference between the first RSTD estimate and the first RSTD uncertainty to a sum of the first RSTD estimate and the first RSTD uncertainty. In some aspects, a modem of the UE performs reception and transmission operations for receiving the first PRS and does not perform other reception or transmission operations during the search interval. A means for identifying the search interval for the first RSTD value may include the wireless transceiver 810 and one or more processors 802 with dedicated hardware or implementing executable code or software instructions in memory 804 and/or medium 820, such as the positioning session module 822, in UE 800 shown in FIG. 8.

At block 906, the UE receives wireless signals during the identified search interval. A means for receiving the wireless signals during the identified search interval may include the wireless transceiver 810 and one or more processors 802 with dedicated hardware or implementing executable code or software instructions in memory 804 and/or medium 820, such as the positioning session module 822, in UE 800 shown in FIG. 8.

At block 908, the UE determines a Fast Fourier Transform (FFT) window offset for decoding a first positioning reference signal (PRS) received during the identified search interval. In some aspects, the FFT window offset is not based on a cell reference signal (CRW) or tracking reference signal (TRS) of a serving cell associated with the UE. In some aspects, the UE may further adjust the determined FFT window offset with respect to timing of an anchor serving cell associated with the UE. In some aspects, the determined FFT window offset is an offset which aligns the FFT window with the first PRS. In some aspects, the FFT window offset is not an integer number of offset symbols with respect to timing of an anchor serving cell associated with the UE. A means for determining the FFT window offset for decoding the first PRS may include the wireless transceiver 810 and one or more processors 802 with dedicated hardware or implementing executable code or software instructions in memory 804 and/or medium 820, such as the positioning session module 822, in UE 800 shown in FIG. 8.

At block 910, the UE determines the first RSTD value based at least in part on the determined FFT window offset. In some aspects, the first RSTD value is associated with a first transmission and reception point (TRP) associated with the first PRS. In other aspects, the first RSTD value may be associated with a neighbor cell or another wireless device associated with the first PRS. In some aspects, the UE may determine the first RSTD value concurrently with determining the FFT window offset in block 908. A means for determining the first RSTD value may include the wireless transceiver 810 and one or more processors 802 with dedicated hardware or implementing executable code or software instructions in memory 804 and/or medium 820, such as the positioning session module 822, in UE 800 shown in FIG. 8.

In some aspects, the operation 900 may further include determining an FFT window offset for decoding a subsequently received second PRS based at least in part on the first RSTD value. IN some aspects the operation 900 may further include determining a second RSTD uncertainty associated with the second RSTD value, where the second RSTD uncertainty is less than the first RSTD uncertainty. In some aspects the second RSTD estimate is equal to the first RSTD value.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

Implementation examples are described in the following numbered clauses:

1. A method for determining a first reference signal time difference (RSTD) value, the method performed by a user equipment (UE) associated with a wireless network and including:

determining a first RSTD estimate and a first RSTD uncertainty associated with the first RSTD value;

identifying a search interval for the first RSTD value, the search interval extending from a difference between the first RSTD estimate and the first RSTD uncertainty to a sum of the first RSTD estimate and the first RSTD uncertainty;

receiving wireless signals during the identified search interval;

determining a Fast Fourier Transform (FFT) window offset for decoding a first positioning reference signal (PRS) received during the identified search interval; and determining the first RSTD value based at least in part on the determined FFT window offset.

2. The method of clause 1, wherein the first RSTD value is associated with a first transmission and reception point (TRP) associated with the first PRS.

3. The method of any of clauses 1-2, further including determining an FFT window offset for decoding a subsequently received second PRS based at least in part on the first RSTD value.

4. The method of clause 3, further including determining a second RSTD uncertainty associated with the second RSTD value, the second RSTD uncertainty less than the first RSTD uncertainty.

5. The method of any of clauses 3-4, wherein the second RSTD estimate is equal to the first RSTD value.

6. The method of any of clauses 1-5, wherein the FFT window offset is determined concurrently with determining the first RSTD value.

7. The method of clause 1, further including adjusting adjust the determined FFT window offset with respect to timing of an anchor serving cell associated with the UE.

8. The method of any of clauses 1-7, wherein the FFT window offset is not based on a cell reference signal (CRS) or tracking reference signal (TRS) of a serving cell associated with the UE.

9. The method of any of clauses 1-8, wherein determining the FFT window offset aligns the FFT window with the first PRS.

10. The method of any of clauses 1-9, wherein during the search interval a modem of the UE performs reception and transmission operations for receiving the first PRS and does not perform other reception or transmission operations.

11. The method of any of clauses 1-10, wherein the FFT window offset for decoding the first PRS is not an integer number of offset symbols with respect to timing of an anchor serving cell associated with the UE.

12. A user equipment (UE) configured to determine a first reference signal time difference (RSTD) value, the UE associated with a wireless network and including:

a wireless transceiver configured to wirelessly communicate with entities in the wireless network;

at least one memory; and at least one processor coupled to the wireless transceiver and the at least one memory, wherein the at least one processor is configured to:

determine a first RSTD estimate and a first RSTD uncertainty associated with the first RSTD value;

identify a search interval for the first RSTD value, the search interval extending from a difference between the first RSTD estimate and the first RSTD uncertainty to a sum of the first RSTD estimate and the first RSTD uncertainty;

receive, via the wireless transceiver, wireless signals during the identified search interval;

determine a Fast Fourier Transform (FFT) window offset for decoding a first positioning reference signal (PRS) received during the identified search interval; and determine the first RSTD value based at least in part on the determined FFT window offset.

13. The UE of clause 12, wherein the first RSTD value is associated with a first transmission and reception point (TRP) associated with the first PRS.

14. The UE of any of clauses 12-13, wherein the at least one processor is further configured to determine an FFT window offset for decoding a subsequently received second PRC based at least in part on the first RSTD value.

15. The UE of clause 14, wherein the at least one processor is further configured to determine a second RSTD uncertainty associated with the second RSTD value, the second RSTD uncertainty less than the first RSTD uncertainty.

16. The UE of any of clauses 14-15, wherein the second RSTD estimate is equal to the first RSTD value.

17. The UE of any of clauses 12-16, wherein the FFT window offset is determined concurrently with determining the first RSTD value.

18. The UE of any of clauses 12-17, wherein the at least one processor is further configured to adjust the determined FFT window offset with respect to timing of an anchor serving cell associated with the UE.

19. The UE of any of clauses 12-18, wherein the FFT window offset is not based on a cell reference signal (CRS) or tracking reference signal (TRS) of a serving cell associated with the UE.

20. The UE of any of clauses 12-19, wherein the FFT window offset for decoding the first PRS is not an integer number of offset symbols with respect to timing of an anchor serving cell associated with the UE.

21. The UE of any of clauses 12-20, wherein during the search interval the wireless transceiver performs reception and transmission operations for receiving the first PRS and does not perform other reception or transmission operations.

22. A non-transitory computer-readable storage medium storing instructions that, when executed by one or more processors of a user equipment (UE) associated with a wireless network, cause the UE to perform operations including:

determining a first RSTD estimate and a first RSTD uncertainty associated with a first RSTD value;

identifying a search interval for the first RSTD value, the search interval extending from a difference between the first RSTD estimate and the first RSTD uncertainty to a sum of the first RSTD estimate and the first RSTD uncertainty;

receiving wireless signals during the identified search interval;

determining a Fast Fourier Transform (FFT) window offset for decoding a first positioning reference signal (PRS) received during the identified search interval; and determining the first RSTD value based at least in part on the determined FFT window offset.

23. The non-transitory computer-readable storage medium of clause 22, wherein the first RSTD value is associated with a first transmission and reception point (TRP) associated with the first PRS.

24. The non-transitory computer-readable storage medium of any of clauses 22-23, wherein execution of the instructions causes the UE to perform operations further including determining an FFT window offset for decoding a subsequently received second PRC based at least in part on the first RSTD value.

25. The non-transitory computer-readable storage medium of clause 24, wherein execution of the instructions causes the UE to perform operations further including determining a second RSTD uncertainty associated with the second RSTD value, the second RSTD uncertainty less than the first RSTD uncertainty.

26. The non-transitory computer-readable storage medium of any of clauses 24-25, wherein the second RSTD estimate is equal to the first RSTD value.

27. The non-transitory computer-readable storage medium of any of clauses 22-26, wherein the FFT window offset is determined concurrently with determining the first RSTD value.

28. The non-transitory computer-readable storage medium of any of clauses 22-27, wherein execution of the instructions causes the UE to perform operations further including adjusting the first RSTD value based on timing of an anchor serving cell associated with the UE.

29. The non-transitory computer-readable storage medium of any of clauses 22-28, wherein the FFT window offset is not based on a cell reference signal (CRS) or tracking reference signal (TRS) of a serving cell associated with the UE.

30. The non-transitory computer-readable storage medium of any of clauses 22-29, wherein the FFT window offset for decoding the first PRS is not an integer number of offset symbols with respect to timing of an anchor serving cell associated with the UE.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for determining a first reference signal time difference (RSTD) value, the method performed by a user equipment (UE) associated with a wireless network and comprising:

determining a first RSTD estimate and a first RSTD uncertainty associated with the first RSTD value;

identifying a search interval for the first RSTD value, the search interval extending from a difference between the first RSTD estimate and the first RSTD uncertainty to a sum of the first RSTD estimate and the first RSTD uncertainty;

receiving wireless signals during the identified search interval;

determining a Fast Fourier Transform (FFT) window offset for decoding a first positioning reference signal (PRS) received during the identified search interval; and determining the first RSTD value based at least in part on the determined FFT window offset.

2. The method of claim 1, wherein the first RSTD value is associated with a first transmission and reception point (TRP) associated with the first PRS.

3. The method of claim 1, further comprising determining an FFT window offset for decoding a subsequently received second PRS based at least in part on the first RSTD value.

4. The method of claim 3, further comprising determining a second RSTD uncertainty associated with a second RSTD value, the second RSTD uncertainty less than the first RSTD uncertainty.

5. The method of claim 3, wherein the second RSTD value is equal to the first RSTD value.

6. The method of claim 1, wherein the FFT window offset is determined concurrently with determining the first RSTD value.

7. The method of claim 1, further comprising adjusting the determined FFT window offset with respect to timing of an anchor serving cell associated with the UE.

8. The method of claim 1, wherein the FFT window offset is not based on a cell reference signal (CRS) or tracking reference signal (TRS) of a serving cell associated with the UE.

9. The method of claim 1, wherein determining the FFT window offset aligns the FFT window with the first PRS.

10. The method of claim 1, wherein during the search interval a modem of the UE performs reception and transmission operations for receiving the first PRS and does not perform other reception or transmission operations.

11. The method of claim 1, wherein the FFT window offset for decoding the first PRS is not an integer number of offset symbols with respect to timing of an anchor serving cell associated with the UE.

12. A user equipment (UE) configured to determine a first reference signal time difference (RSTD) value, the UE associated with a wireless network and comprising:

a wireless transceiver configured to wirelessly communicate with entities in the wireless network;

at least one memory; and at least one processor coupled to the wireless transceiver and the at least one memory, wherein the at least one processor is configured to:

determine a first RSTD estimate and a first RSTD uncertainty associated with the first RSTD value;

identify a search interval for the first RSTD value, the search interval extending from a difference between the first RSTD estimate and the first RSTD uncertainty to a sum of the first RSTD estimate and the first RSTD uncertainty;

receive, via the wireless transceiver, wireless signals during the identified search interval using the wireless transceiver;

determine a Fast Fourier Transform (FFT) window offset for decoding a first positioning reference signal (PRS) received during the identified search interval; and determine the first RSTD value based at least in part on the determined FFT window offset.

13. The UE of claim 12, wherein the first RSTD value is associated with a first transmission and reception point (TRP) associated with the first PRS.

14. The UE of claim 12, wherein the at least one processor is further configured to determine an FFT window offset for decoding a subsequently received second PRC based at least in part on the first RSTD value.

15. The UE of claim 14, wherein the at least one processor is further configured to determine a second RSTD uncertainty associated with a second RSTD value, the second RSTD uncertainty less than the first RSTD uncertainty.

16. The UE of claim 14, wherein the second RSTD value is equal to the first RSTD value.

17. The UE of claim 12, wherein the FFT window offset is determined concurrently with determining the first RSTD value.

18. The UE of claim 12, wherein the at least one processor is further configured to adjust the determined FFT window offset with respect to timing of an anchor serving cell associated with the UE.

19. The UE of claim 12, wherein the FFT window offset is not based on a cell reference signal (CRS) or tracking reference signal (TRS) of a serving cell associated with the UE.

20. The UE of claim 12, wherein the FFT window offset for decoding the first PRS is not an integer number of offset symbols with respect to timing of an anchor serving cell associated with the UE.

21. The UE of claim 12, wherein during the search interval the wireless transceiver performs reception and transmission operations for receiving the first PRS and does not perform other reception or transmission operations.

22. A non-transitory computer-readable storage medium storing instructions that, when executed by one or more processors of a user equipment (UE) associated with a wireless network, cause the UE to perform operations comprising:

determining a first RSTD estimate and a first RSTD uncertainty associated with a first RSTD value;

identifying a search interval for the first RSTD value, the search interval extending from a difference between the first RSTD estimate and the first RSTD uncertainty to a sum of the first RSTD estimate and the first RSTD uncertainty;

receiving wireless signals during the identified search interval;

determining a Fast Fourier Transform (FFT) window offset for decoding a first positioning reference signal (PRS) received during the identified search interval; and determining the first RSTD value based at least in part on the determined FFT window offset.

23. The non-transitory computer-readable storage medium of claim 22, wherein the first RSTD value is associated with a first transmission and reception point (TRP) associated with the first PRS.

24. The non-transitory computer-readable storage medium of claim 22, wherein execution of the instructions causes the UE to perform operations further comprising determining an FFT window offset for decoding a subsequently received second PRC based at least in part on the first RSTD value.

25. The non-transitory computer-readable storage medium of claim 24, wherein execution of the instructions causes the UE to perform operations further comprising determining a second RSTD uncertainty associated with a second RSTD value, the second RSTD uncertainty less than the first RSTD uncertainty.

26. The non-transitory computer-readable storage medium of claim 24, wherein the second RSTD value is equal to the first RSTD value.

27. The non-transitory computer-readable storage medium of claim 22, wherein the FFT window offset is determined concurrently with determining the first RSTD value.

28. The non-transitory computer-readable storage medium of claim 22, wherein execution of the instructions causes the UE to perform operations further comprising adjusting the first RSTD value based on timing of an anchor serving cell associated with the UE.

29. The non-transitory computer-readable storage medium of claim 22, wherein the FFT window offset is not based on a cell reference signal (CRS) or tracking reference signal (TRS) of a serving cell associated with the UE.

30. The non-transitory computer-readable storage medium of claim 22, wherein the FFT window offset for decoding the first PRS is not an integer number of offset symbols with respect to timing of an anchor serving cell associated with the UE.

* * * * *